United States Patent [19]

Schlieckmann

[11] 4,070,008

[45] Jan. 24, 1978

[54] HIGH PRESSURE MIXING HEAD

[75] Inventor: Alfred Schlieckmann, Lindau, Germany

[73] Assignee: Admiral Maschinenfabrik GmbH, Leuchtenbergweb, Germany

[21] Appl. No.: 771,403

[22] Filed: Feb. 23, 1977

[30] Foreign Application Priority Data

Feb. 25, 1976 Germany .............................. 2607641

[51] Int. Cl.[2] .......................................... B01F 15/02
[52] U.S. Cl. ................................. 366/159; 23/252 A; 366/179; 366/189
[58] Field of Search ....................... 259/4 R, 18, 36, 7, 259/8, 17, 27, 47; 425/146, 167, 451.2, DIG. 223; 23/252 A, 252 R, 253 A

[56] References Cited

U.S. PATENT DOCUMENTS

| 3,183,556 | 5/1965 | Studli | 425/DIG. 223 |
| 3,220,801 | 11/1965 | Rill | 259/4 R |
| 3,857,550 | 12/1974 | Knipp | 259/4 R |
| 3,908,966 | 9/1975 | Boden | 259/4 R |
| 3,999,740 | 12/1976 | McCorvey | 259/8 |

*Primary Examiner*—Robert W. Jenkins
*Attorney, Agent, or Firm*—St.Onge, Mayers, Steward & Reens

[57] ABSTRACT

The specification describes a high pressure mixing head for producing a chemically reactive mixture for producing foam articles. An expulsion piston adapted to move in a mixing chamber with inlet ports for the reactive mixture components and with an outlet port is driven by a drive piston. In order to achieve a higher velocity of the expulsion piston in the vicinity of the inlet ports the drive piston is constructed in two parts, an inner piston part and an outer annular piston part adapted to slide on the inner piston part. At the end of the stroke the outer piston part is arrested and the inner piston part continues to move at a higher velocity, a projection at the end of the drive piston moving into a recess. At the beginning of the stroke in the other direction the projection is moved out of the recess by a pressure medium at a high speed until the projection has cleared the recess.

9 Claims, 2 Drawing Figures

HIGH PRESSURE MIXING HEAD

BACKGROUND OF INVENTION

1. Field to which invention relates

The invention relates to a high pressure mixing head for the production of a chemically reactive mixture of at least two plastics components and other mixtures comprising a mixing chamber, which has inlet ports for the individual plastics components and an outlet port for the plastics component mixture, and an expulsion piston, which is arranged in the mixing chamber and has the same cross-section as it, and which is connected with a drive piston, arranged in a drive cylinder and adapted to be actuated by pressure medium, in particular hydraulic oil, for movement of the expulsion piston in a reciprocating manner out of a rear position leaving the inlet ports open into a position adjacent to the front outlet port, the inlet ports being simultaneously shut off from the mixing chamber.

2. The prior art

In the case of a previous mixing head of this type the inlet ports for the individual plastics components open and close alternately and simultaneously without separate control means, having to be provided for the opening and closing, since during the reciprocating movement of the expulsion piston it sweeps over the inlet ports. The expulsion of the mixture is further accompanied by purging from the mixing chamber wall to remove vestiges of mixture, which are removed by the expulsion piston, having the same cross-section as the mixing chamber as the latter is driven outwards. For return of the plastics components the expulsion piston is provided with transfer flow ducts by means of which the inlet ports are arranged to be connected with the return flow ducts with which they are provided, at the same time as they are shut off from the mixing chamber.

In the case of this previous high pressure mixing head with counter-flow injection mixing the expulsion piston is moved during the whole stroke of its reciprocating movement with the same or with a constant velocity. This velocity of the expulsion piston is however limited by the constructional complexity, which can be tolerated for the hydraulic drive required for the piston.

In certain cases it has been found in practice that with certain plastics components, more particularly in the case of plastics components which are difficult to mix up, there is only an incomplete mixing action at the beginning and at the end of the injection operation. The reason for this insufficient mixing, which only occurs in the beginning and at the end of the injection operation, is most probably due to the fact that at the beginning and at the end of the mixing operation when the expulsion piston is sweeping over the mixing chamber inlet ports only a part of the full entry cross-section of the ports is available for a short time so that the injection operation differs in character from normal injection with the full entry cross-section available.

SUMMARY OF INVENTION

One aim of the present invention is now that of avoiding this disadvantage and providing an improved high pressure mixing head in the case of which even during the initial and termial phases of the injection operation and even in the case of components which do not mix readily complete mixing and accordingly a satisfactory foam product can be attained. This aim is achieved in accordance with the invention in that the drive piston consists of a piston which is rigidly connected with the expulsion piston and an annular piston which is more particularly concentrically arranged on the first mentioned piston and is adapted to shift between two abutments on the piston in an axial direction and the annular piston has its inner wall making sealing engagement with the outer wall of the first mentioned piston and has its outer wall making sealing engagement with the inner wall of the drive cylinder, in that the end, remote from the expulsion piston, of the piston consists of plunger piston-like projection, which cooperates with a recess with the same shape and cross-section shortly before and on reaching the one end position of the reciprocating piston movement and the recess is arranged in an end wall of the drive cylinder and is connected with one or two connections for the pressure medium for the drive cylinder and that the longitudinal extent, measured in the direction of movement of the piston, of the recess is smaller than or equal to the axial relation shift of the first mentioned piston than the annular piston and is greater than or equal to the axial distance between the end face of the expulsion piston in its rear terminal position and the remote end of the entry port.

Owing to this construction in accordance with the invention of the drive piston it is possible to ensure that the time taken for the expulsion piston to sweep over the mixing chamber inlet ports at the beginning and at the end of the injection operation is substantially shortened and this, surprisingly, leads to a completely satisfactory mixing of the plastics components even at the beginning and the end of the injection operation so that the foam product is completely satisfactory in every respect even in the case of plastics components which are difficult to mix with each other. In particular the increase in the velocity of the expulsion piston at the beginning and end of the injection operation is ensured by the feature that at the beginning and at the end of the injection operation the whole pressure medium, more particularly hydraulic oil flow only serves for displacing the plunger piston-like projection out of the recess having the same shape in the same cross-section in the end wall of the drive cylinder, since in this phase or respectively with this position of the piston the remaining working space of the drive cylinder is shut off from the supply of pressure medium. During the phase mentioned the pressure medium, which is supplied from a pump, not shown, with a constant rate of flow, only acts on the relatively small cross-sectional area of the plunger piston-like projection of the piston so that having regard to the proportion between the size of this small cross-sectional area and the overall cross-sectional area of the drive cylinder there is a corresponding increase in the piston velocity in the phase mentioned as compared with the normal piston speed during the remaining part of the piston stroke.

A further advantage is due to the fact that the necessary high speed of the expulsion piston is obtained without an expensive further development of the hydraulic drive system and respectively the hydraulic pump, since it is only the drive piston and the drive cylinder which are subject to a further specific development in accordance with the invention.

In accordance with a preferred embodiment of the invention the diameter of the plunger piston-like projection of the piston is less than half the diameter of the annular piston.

In accordance with a further preferred embodiment the two end faces of the annular piston are provided with annular damping grooves, which can be brought into engagement with the abutments, constructed as annular shoulders, on the piston.

In accordance with a further preferred embodiment of the invention each inlet port is provided with an inlet valve, which on return movement is located in its closed position and as a result the plastics components circulate in each case under low pressure for reflux or recycling. As a result it is not only the advantages connected with recycling which are obtained but also the following advantages.

Recycling, which lasts a substantially longer time than the injection operation, can be carried out in the low pressure level so that the whole recycling system need only be designed for low pressure and no sealing problems occur. The high pressure required for counter-current injection is thus only built up and maintained for short times proceeding and during the injection operation in a manner to be described in more detail below. Furthermore there is the advantage that owing to the inlet valves, respectively arranged for the inlet ports, it is possible to ensure that during the recycling phase the expulsion piston is not constantly subjected to the action of the plastics components. By means of the inlet valves, which are closed during the recycling phase, it is possible to shut off the expulsion piston completely from the plastics components so that no problems concerned with sealing, clogging or sticking occur. Furthermore there are no pressure surges on switching over from recycling to injection and vice versa, for the inlet valves are opened automatically on reaching the injection pressure so that it is possible to avoid undesired pressure surges can be avoided in a very simple manner either by ensuring that more or less simultaneously the expulsion piston clears the inlet ports or by arranging a pressure limiting valve between the supply and return ducts. It is thus possible to prevent in any case the possibility of plastics components being supplied, albeit for a short time, to the mixing head and not being simultaneously removed, something which leads to the undesired pressure peaks or surges in the case of the previous mixing head.

In accordance with the preferred form of the invention the beginning of the shot time is timed by sensing the position of the expulsion piston. This has the great advantage that it is possible to avoid any time lag between the movement of the expulsion piston and the course of the shot time. In other words the shot time as theoretically calculated and required for satisfactory foam production is in precise agreement with the actual shot time. In this respect it is convenient to set the beginning of the shot time at the beginning of clearance of the inlet ports by the expulsion piston and for sensing or detecting the position, determining the beginning of the shot time, of the expulsion piston a limit switch can be provided.

LIST OF SEVERAL FIGURES OF DRAWINGS

In order to provide a more detailed explanation of the invention reference will now be had to the following description of a preferred embodiment which is diagrammatically shown in the accompanying drawings.

DESCRIPTION OF PREFERRED EMBODIMENT

Figure 1:
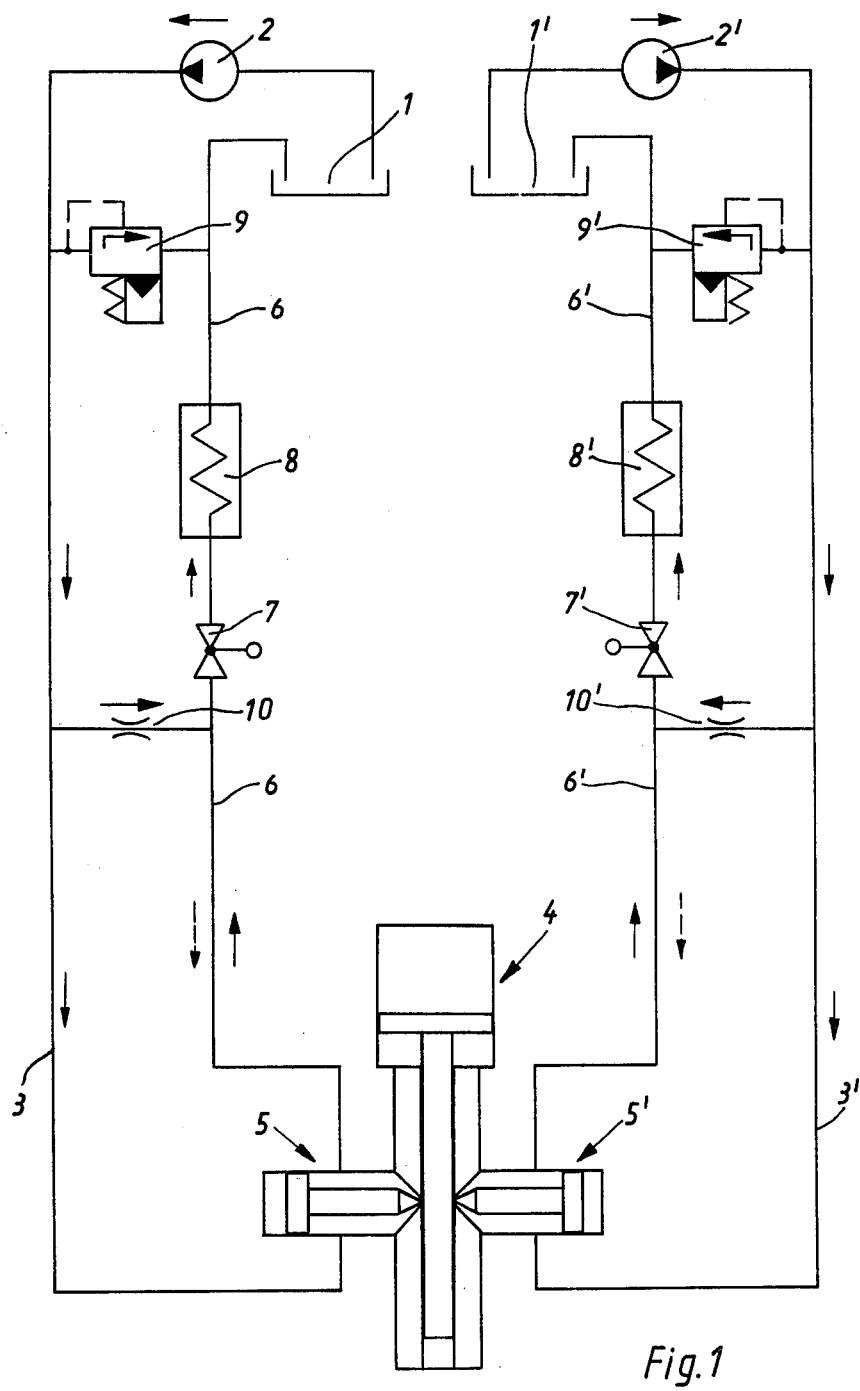
FIG. 1 shows a flow diagram of the injection apparatus as a whole with the mixing head.

FIG. 1 represents a flow diagram of the injection apparatus taken as a whole with the mixing head. The apparatus is designed for two different plastics components. For more than two plastics components analogous further developement of the flow diagram would be required.

The supply of more than two plastics components would not involve any difficulties, since the mutual separation of different plastics components does not give rise to any problems, since in contrast to the previously proposed mixing head the separation is not at the limited periphery of the expulsion piston.

The flow circuit for the plastics components consists — considered in the direction of flow — of a supply container 1, a pump (for example a radial piston pump) 2, a feed line 3, a mixing head 4 with an inlet valve 5, a return flow line 6, a cock valve 7 and a cooler 8. Between the feed line 3 and the return line 6 there is a pressure limiting valve 9 which is provided at such a position that the pump forms a flow circuit with the supply container 1. Between the feed line 3 and the return line 6 there is furthermore a by-pass line 10 at such a position that a circuit is formed via the supply container 1, the pump 2, the by pass line 10, the cock valve 7 and the cooler 8.

During the recycling phase the flow is along the path indicated by the arrows shown in continuous lines and owing to a suitable selection of the flow cross-section only a substantially minor amount of the plastics is recycled through the inlet valve 5, for the major part of the plastics components is recirculated through the by pass duct or line 10. During the injection operation started by closing the cock valve 7 the supply of plastics components to the inlet valve 5 occurs additionally to the feed line 3 and also via a part of the return line 6 in the direction of the arrow drawn with broken lines.

The above explanations apply analogously with respect to the circulating of the other plastics components, which is represented in FIG. 1 on the right hand side of the drawing in the case of which like parts are denoted by like reference numerals provided with an additional stroke so that a description by way of repetition is not called for.

Figure 2:
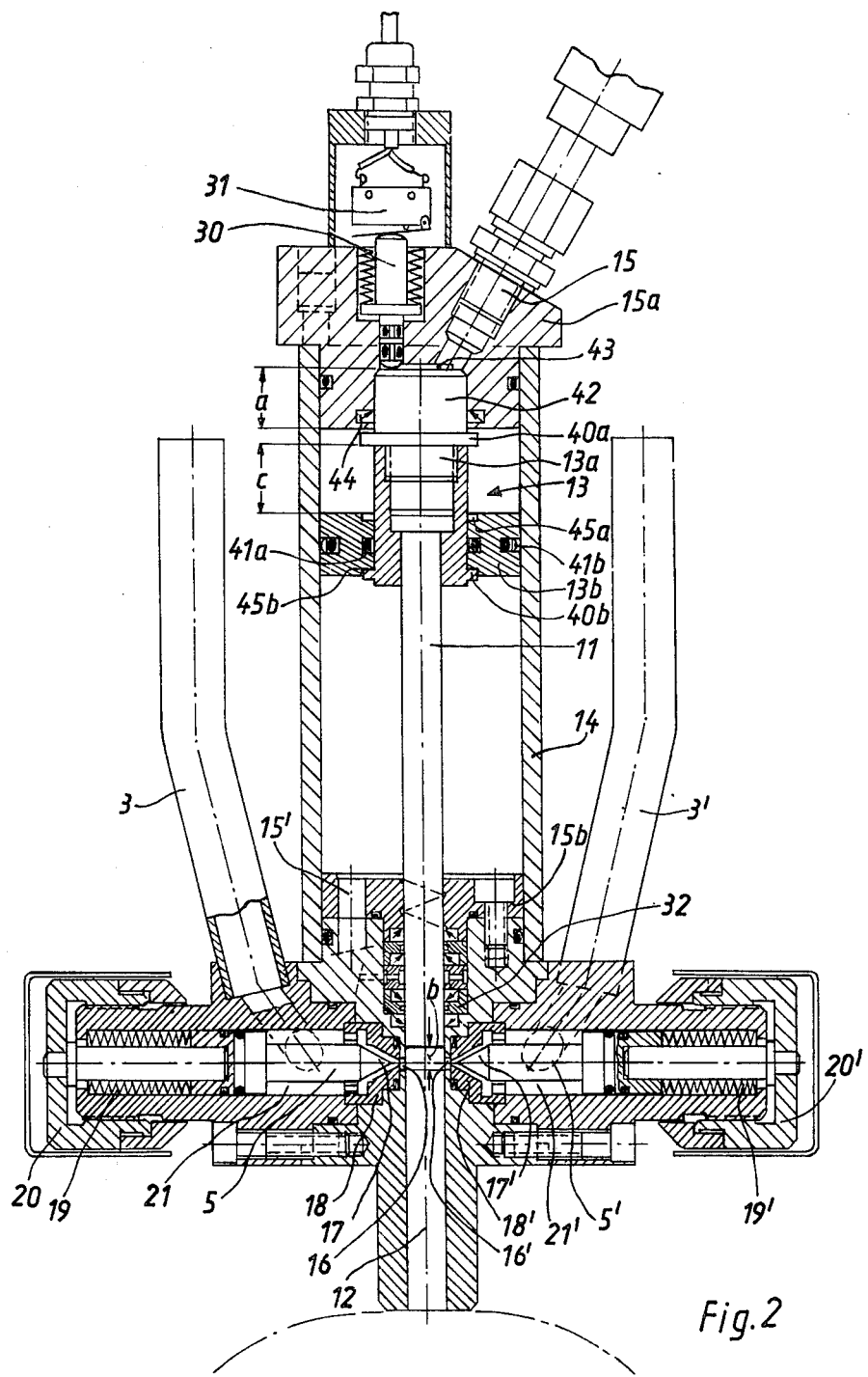
FIG. 2 is a median section through the high pressure mixing head, which is only diagrammatically represented in FIG. 1.

With respect to the high pressure mixing head itself represented in all details in FIG. 2 in what follows only the parts which are important for function of the apparatus described.

The head 4 has a central expulsion piston 11, which is lapped into a cylindrical mixing chamber 12 of the same cross-section. The expulsion piston 11 as represented in its upper or, respectively, rear position is caused to reciprocate by a drive piston 13 connected rigidly with it, that is to say between the rear end position represented in FIG. 2 and the front end position in which the front end of the expulsion piston 11 is flush with the free end of the cylindrical mixing chamber 12. The actuation of the drive piston 13, is brought about by means of a pneumatic or hydraulic pressure medium to one or the other side of the piston.

The supply of the pressure medium, which is preferably hydraulic oil, is on the one hand via a connection 15, which opens into an end wall 15a of the drive cylinder, while for acting on the opposite side of the drive piston a connection 15', only indicated diagrammatically is provided, which opens into the opposite drive cylinder end wall 15b.

The drive piston 13 consists of a piston 13a or inner piston port, rigidly connected with the expulsion piston 11, and an annular piston 13b or outer piston port, which is arranged concentrically on the piston 13a and can be moved axially between two abutments 40a and 40b and the piston 13a, 13b constructed in the manner of shoulders. The piston 13a for its part consists of several parts which are rigidly connected with each other, something which is only due to manufacturing considerations so that no further details on this point are called for. The annular piston 13b, whose diameter is somewhat greater than twice the diameter of the piston 13a. The gasket 41a is provided to make a seal between the inner wall of the piston 13b and the outer wall of the piston 13a while an annular gasket 41b provides a seal with respect to the inner wall of the drive cylinder 14. The end, remote from the expulsion piston 11, of the piston 13a consists of a plunger piston-like projection 42, which cooperates with a recess 43, having the same shape and cross section, shortly before and on reaching the one end position of the reciprocating piston movement. The recess 43 is arranged in the annular 15a of the drive cylinder and it is connected with a pressure medium connection 15, which opens in the vicinity of its bottom limiting surface. The longitudinal extent or depth $a$ as measured in the longitudinal direction of the piston and drive cylinder and in the direction of movement of the piston, of the recess 43 is less than or equal to the axial relative shift $c$ with the piston 13a and the annular piston 13b and is larger than or equal to the axial distance $b$ between the end face of the expulsion piston in its rear end position from the remote end of the inlet port, as is shown in detail in FIG. 2. In practice it has been found to be satisfactory if $a$ is more than or equal to $b + 1$ mm. Owing to this added amount of 1 mm it is possible to ensure than in practice the inlet ports 16, 16' are swept over by the expulsion piston at a higher speed completely at the beginning and end of the injection operation. This increased or higher expulsion piston velocity is explained as follows:

The hydraulic pump not shown in the drawing supplies hydraulic oil with a constant rate to the drive piston-cylinder arrangement. At the beginning of the expulsion operation of the expulsion piston 11 this hydraulic oil flows through the connection 15 into the recess 43, within which at this point in time the plunger piston-like projection 42 of the piston 13a is located in the position shown in FIG. 2, the interior of the recess 43 being substantially filled, apart from a small space at the end face, by the plunger piston-like projection 42. Since the inner wall of the recess 43 is sealed off with respect to the cylindrical outer wall of the plunger piston-like projection 42 by means of an annular seal or gasket 44, the whole quantity of oil under pressure, which is supplied through the connection 15 opening into the recess 43, only serves for displacing the piston 13a and, respectively the plunger piston-like projection 42 out of the recess 43. Since accordingly only the piston 13a having a relatively small cross-section is displaced, the movement of the piston 13a and also the movement of the expulsion piston 11 connected rigidly with it occurs at a higher speed, a relative movement taking place between the piston 13a and the annular piston 13b.

The piston 13a and the expulsion piston 11 continue to move with the higher velocity until the plunger piston-like projection 42 has completely cleared the recess 43. At that point in time at which the plunger piston-like projection 42 has completely cleared the recess 43, the path for the oil under pressure supplied via the connection 15 into the interior of the drive cylinder 14 is freed for the first time. This will mean that as from this point in time the piston 13a and the annular piston 13b will be moved jointly as a single unit. The piston volume displaced on this shifting movement is in this respect larger than was the case with the preceding displacement movement by an amount equal to the volume of the annular piston 13b and to which reason owing to the constant rate of flow of the hydraulic oil the piston movement and also the movement of the expulsion piston 11 occur with a lower speed.

In the case of the above mentioned relative movement of the piston 13a and the annular piston 13b, the annular piston 13b alternately comes into engagement with the shoulder-like projection 40a and 40b. In order to reduce the sudden loading which would otherwise occur the annular piston 13b is provided on both its end sides with annular grooves 45a and 45b, which are generally of the same shape and cross-section as the shoulder-like abutments 40a and 40b and come into engagement with them, when the engagement takes place between the two pistons 13a and 13b. Owing to the hydraulic oil displaced when this occurs from the annular grooves 45a and 45b respectively there is a very substantial damping of the engagement impetus and accordingly there is a reduction in the loading of the two pistons 13a and 13b.

As already mentioned the longitudinal dimension $a$ of the recess 43 is larger than or equal to the distance $b + 1$ mm in order to ensure definitely that the whole closing operation of the entry ports 16, 16' occurs at a higher speed.

During the further piston movement, taking place with a reduced or respectively normal speed, the piston 13a and the annular piston 13b have the relative position shown in FIG. 2. The joint movements of the pistons 13a and 13b comes to a halt when the piston 13a, which projects downwards likely with respect to the annular piston 13b, reaches the adjacent end face of the drive piston end wall 15b, and simultaneously the end, which is at the bottom as shown in FIG. 2, of the expulsion piston 11 is flush with the outlet end of the mixing chamber 12 so that the mixing chamber 12 is completely cleared of any vestiges of plastics materials. The slot is now terminated.

At the beginning of the following shot the above mentioned course of movement occurs in the opposite direction and the hydraulic oil, pumped by the hydraulic pump, which is not shown is forced to the connection 15' located in the end wall 15b of the drive cylinder, into the inerior of the drive cylinder 14. When this is done the pistons 13a and 13b are subjected to the action of pressure on the opposite side to that acted upon during the expulsion operation and they are displaced jointly as a unit upwards in terms of FIG. 2. Owing to the joint displacement of the two pistons 13a and 13b during which the piston 13b has its annular groove 45a in engagement with the shoulder-like projection 40a of the piston 13a, the piston movement takes place at the lower or normal stroke velocity. The increase in the stroke velocity occurs at that point in time at which the free end of the plunger piston-like projection 42 begins to enter the recess 43, since at this same time the further outward flow of the hydraulic oil is impeded which is located in the annular space between the annular piston 13b and the drive chamber end wall 15a. This will mean that the whole flow of the hydraulic oil, which is supplied through the connection 15' is available for further displacement of the piston 13a, since the annular piston 13b is prevented from being shifted further and from now onwards is stationary. This further displacement of the piston 13a occurs accordingly owing to the reduced displacement volume at a greater velocity so that the inlet ports 16 and 16' are opened with a greater speed.

The movement, occurring at an increased velocity, of the piston 13a comes to an end when the shoulder-like abutment 40b comes into engagement with the annular groove 45b and the two pistons 13a and 13b are restored to the position shown in FIG. 2. The axial relative movement c must in this respect be larger than or equal to the longitudinal distance a or, respectively larger than or equal to the distance b in order to ensure that the longitudinal extent a or distance and the axial distance b (leaving out of consideration this time the safety factor of 1 mm) actually represent distances travelled by the piston with the desired higher velocity. The impact occuring at the end of the piston movement occurring with the increased piston speed between the piston 13a and the piston 13b is buffered by the oil displaced out of the annular groove 45b by the shoulder-shaped abutment 40b.

The inlet ports 16 and 16' serving for the supply of the two plastics components into the mixing chamber 12 are arranged at the same level or respectively on the same radius so that they are simultaneously opened and closed by the expulsion piston 11, something which is necessary to avoid undesired lead.

The two inlet ports 16 and 16' are directly adjacent to the associated inlet valves 5 and 5', whose valve cones 17 and 17' cooperate with valveseats 18 and 18' with a suitable mating shape. In order to ensure automatic, pressure dependent opening and closing of the inlet valves 5 and 5', compression springs 19 and 19' are provided so that separate means are not required for actuating the inlet valves. For setting the force or hardness of the compression springs 19 and 19' setting bushes 20 and 20' are provided so that the size of the opening pressure of the inlet valves 5 and 5' can be adjusted in a very simple manner. This opening pressure must naturally be selected so as to be higher than the recycling pressure.

The inlet valves 5 and 5' are arranged for reciprocating movement in valve chambers 21 and 21'. Since the valve shaft forming the center part of the inlet valves 5 and 5', having substantially a smaller diameter than the associated valve chambers, an annular space with a relatively large cross-section is provided, through which flow occurs on recycling without any undesired increase in pressure being brought about. On recycling the plastics component passes via the feed tube 3 or 3' to the valve chamber 21 or 21' respectively and leaves the latter via the return line 6 or 6' respectively, which is not shown, the two inlet valves 5 and 5' being located in the closing position.

Owing to the two inlet valves arranged with their axes perpendicular to the mixing chamber and to the expulsion piston it is therefore possible to avoid action of the plastics components on the expulsion piston and on the mixing chamber during the recycle phase, which often lasts a relatively long time so that no sealing and sticking or clogging problems arise. Furthermore recycling can be carried out using a relatively low pressure of approximately 30 atmospheres gauge since at all positions of the flow circuit sufficiently large flow cross-sections are available; for recycling does not have to be via the mixing chamber inlet ports. In this respect it is also highly advantageous that in any case only a very minor fraction of the total quantity is recycled through the mixing head in accordance with the invention, since the major part of the quantity of plastics recycles through the by-pass line 10.

On switching over from recycling to injection firstly the cock valve 7 is closed — for example by means of a handle which is not shown — so that the whole quantity of plastics components, which is supplied to the feed pump 2, is pumped via the feed line 3 and a part of the return line 6 into the valve chamber of the inlet valve 5. The same also applies as regards the other plastics component and respectively as regards the oppositely placed inlet valve 5'. Since initially the plastics components cannot escape at any position the necessary, high injection pressure of more than 10 atmospheres gauge is very rapidly built up throughout the system and the precise setting of high pressure for the injection desired is carried out by the pressure limiting valve 9 or 9' respectively. On reaching the desired injection pressure or shortly before the two inlet valves 5 and 5' open and after the opening the expulsion piston 11, previously located in the front end position, is moved into the rear end position shown in FIG. 2. In order to achieve the greatest possible precision in metering it is thus expedient to cause metering to be carried out exclusively by the expulsion piston 11, for which reason the two inlet valves 5 and 5' are opened shortly before the expulsion piston 11 uncovers the inlet openings 16, 16'.

As already mentioned the termination of the injection operation is in this respect brought about by moving the expulsion piston 11 out of the rear end position into the front end position, where the front end of the expulsion piston 11 is flush with the free end of the mixing chamber 12 so that any mixture residue will be completely purged from the mixing chamber 12, something which is also very advantageous from the point of view of precise metering. On termination or directly after it of the expulsion operation the cock valve 7 is opened so that switching over to recycling occurs. The change over from the injection operation to recycling leads to an immediate drop from the high injection pressure of more than 100 atmospheres gauge to the low recycling pressure of approximately 30 atmosphere gauge. Simultaneously with this the two inlet valves 5 and 5' automatically close owing to the pressure drop.

Particularly accurate metering of the injected plastics components can be achieved in the following manner.

The end wall 15a, opposite to the exit of the expulsion piston 11, of the drive cylinder 14 has a spring loaded plunger 30, which is arranged for reciprocating movement in the end wall 15a in the longitudinal direction of the drive cylinder 14 and cooperates with a limit switch 31 arranged outside the drive cylinder 14, that is to say the limit switch 31 is actuated by it. As will be gathered from FIG. 2 of the drawing the spring loaded plunger 30 so cooperates with the end surface of the plunger piston-like projection 42 that at a certain position of the piston 13a and the expulsion piston 11 the plunger 30 and the limit switch 31 are actuated. The position at which actuation of the limit switch 31 occurs is so selected that this actuation coincides with the movement of the end of the expulsion piston 11 over the inlet ports 16 and 16'. This point in time of actuation (time of sweeping over or clearing of the inlet ports 16, 16' by the lower end of the expulsion piston 11) is timed at the beginning of the shot time (beginning of the injection operation). In other words: the shot time is directly timed by the expulsion piston 11, that is to say when a specific position of the expulsion piston 11 is detected. As a result it is possible to achieve a substantially more precise metering of the quantities injected than was previously possible with known mixing heads, for in the case of known mixing heads the course of the shot time and the movement of the expulsion piston occur independently of each other or, respectively, these two operation are initially started simultaneously by a pulse. The consequence of this is however the substantial disadvantage that in cases in which the expulsion piston must firstly be "got on the move" at the beginning of its travel, inaccuracy occurs in the metering, for in such cases the actual shot time is shorter than the calculated shot time. The shot time is thus shortened by a time due to the expulsion piston being "too slow" at the beginning of its movement. Such cases occur relatively often in practice if the time lying between the two different shots is relatively large.

In the case of the mixing head in accordance with the invention the above mentioned difficulties are very simply avoided by arranging for the shot time or of the duration of the shot to be directly started or controlled by the expulsion piston so it is possible to ensure that at the beginning of the shot time the injection procedure immediately begins without any lack of whatever type occurring, which would otherwise lead to too little material being metered out.

At the end of the shot time, whose duration can be timed by any suitable conventional system which is not shown, the piston 13a and simultaneously the expulsion piston 11 are driven out of the end position shown in FIG. 2 into the opposite end position. The time at which one end of the expulsion piston 11 sweeps and clears the inlet ports 16, 16' is in this respect at the end of the shot time so that the selected shot time is in precise agreement with the actual shot time and, respectively with the actual duration of the injection operation.

Instead of compressed air or instead of conventional hydraulic oil it is possible to use a pressure medium for actuating the drive piston 13 in the form of dioctyl phthalate, this avoiding undesired reactions between the pressure medium (for operating the drive piston 13) and the plastics components since dioctyl phthalate does not react chemically with plastics components conventionally used, something which is however the case with hydraulic oil. Such an undesired chemical reaction can thus be avoided in accordance with the invention even if a thin film of pressure medium should be transported by the expulsion piston 11 out of the one working chamber of the pressure cylinder 14 into the mixing chamber 12 despite the intermediate seals 2 and 3.

The mixing head is principally used for the production of polyurethane foam material, that is to say more particularly cushions, automobile seats and the like. In the case of the production of such polyurethane foam material two plastics components consist of toluene diisocyanate and a polyol.

With respect to the above described embodiment of the invention modifications can be made for example by constructing the recycling circuit in the initially described known manner if, in specific cases, it appears reasonable to put up with the concomitant disadvantages. Furthermore in specific cases and under specific circumstances it is possible to dispense with a recycling circuit. Furthermore the type of means for controlling the shot time can be modified if in specific cases precise metering of the quantity of the plastics components is of only subsidiary importance.

In the following claims references to a range lying below and just including and, respectively, range larger than and just including means, equal to or less than and respectively equal to or greater than.

I claim:
1. In a high pressure mixing head for producing a chemically reactive mixture of at least two plastics components and other mixtures, comprising
 a mixing chamber which has inlet ports for the individual plastics components and an outlet port for the plastics component mixture,
 an expulsion piston arranged in the mixing chamber and having the same cross-section as it,
 a drive cylinder,
 and a drive piston arranged in the drive cylinder and adapted to be driven by pressure medium, the drive piston being connected with the expulsion piston for moving the latter between a rear end position leaving the inlet ports uncovered and a position in the vicinity of the front inlet port, the inlet ports being simultaneously shut off from the mixing chamber
the improvement which resides in that
 the drive piston comprises firstly an inner piston part rigidly connected with the expulsion piston and secondly an annular outer piston part arranged on the inner piston part and adapted to move between two abutment surfaces on the inner piston part, the outer annular piston part being sealed off internally with respect to the inner piston part and externally with respect to an inner surface of the drive cylinder, an end of the inner piston part in the form of a plunger piston-like projection adapted to fit into a recess in an end of the drive cylinder having the same shape and cross-section as the projection shortly before and at the end position of the drive piston,
 two connections are provided for connecting the pressure medium with the drive cylinder and one of these connections is connected with the recess,
 and the longitudinal extent, measured in the direction of the piston movement, of the recess is in a range lying below and just including the relative axial movement between the inner and outer piston parts and is in a range larger than and just including the axial distance between the expulsion piston end face in its rear position and the remote end of the inlet ports.

2. The structure as set forth in claim 1 comprising the further improvement that the diameter of the inner piston part amounts to less than half the diameter of the outer piston part.

3. The structure as set forth in claim 1 further comprising the improvement that the two end faces of the annular piston part are provided with one respective annular groove each and these annular grooves are adapted to cooperate with annular surface parts of the inner piston part.

4. The structure as set forth in claim 1 comprising the further improvement of an annular seal for providing a sealing action between the outer wall of the plunger piston-like projection and the inner wall of the recess.

5. The structure as set forth in claim 1 comprising the further improvement that the other connection from the supply of the pressure medium to the double acting drive cylinder is arranged in the other end wall of the drive cylinder.

6. The structure as set forth in claim 1 further comprising the improvement of two respective inlet valves respectively associated for cooperation with the inlet ports for closure on return movement for recycling of the plastics components at a low pressure level.

7. The structure as set forth in claim 1 further comprising the improvement of the means for sensing the position of the expulsion piston before timing the beginning of a shot in accordance with the instant at which the expulsion piston clears the inlet port.

8. The structure as set forth in claim 1 comprising the further improvement that the pressure medium is hydraulic oil.

9. The structure as set forth in claim 1 comprising the further improvement that the annular piston part is concentric with respect to the inner piston part.

* * * * *